O. PARPART.
CHUCK JAW.
APPLICATION FILED MAR. 16, 1908.
926,073.  Patented June 22, 1909.
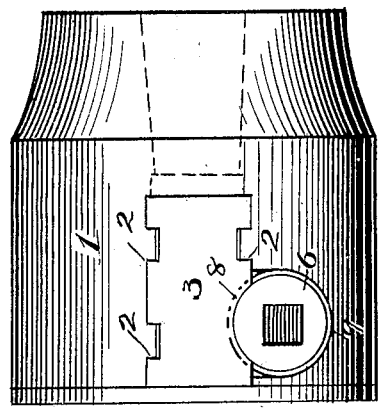
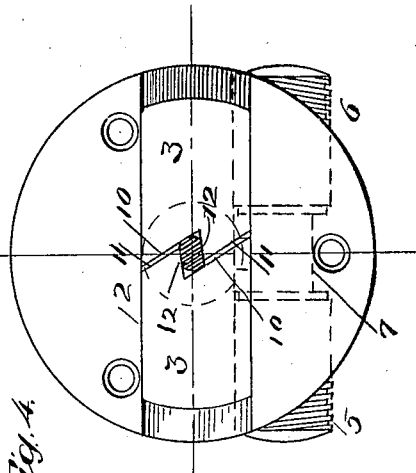
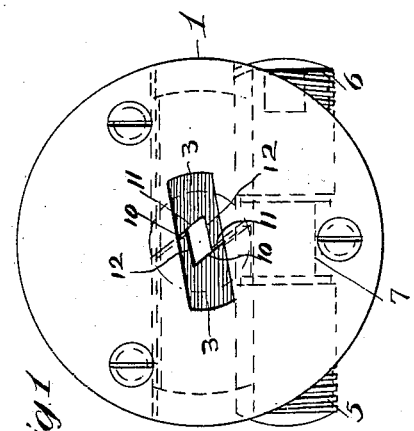
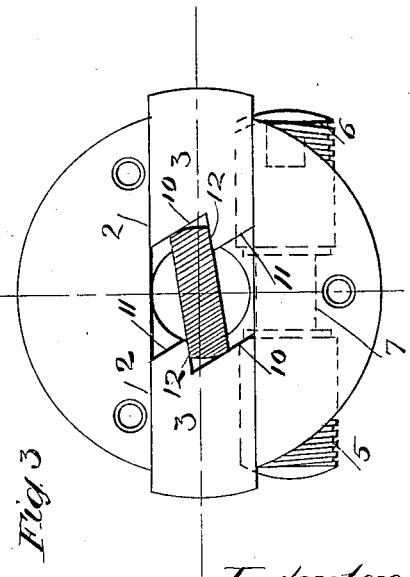
Witnesses
Inventor
Otto Parpart
by Wm. M. Monroe
Attorney

UNITED STATES PATENT OFFICE.

OTTO PARPART, OF CLEVELAND, OHIO.

CHUCK-JAW.

No. 926,073.   Specification of Letters Patent.   Patented June 22, 1909.

Application filed March 16, 1908. Serial No. 421,482.

*To all whom it may concern:*

Be it known that I, OTTO PARPART, a citizen of the United States, and resident of Cleveland, in the county of Cuyahoga and State of Ohio, have invented certain new and useful Improvements in Chuck-Jaws, of which I hereby declare the following to be a full, clear, and exact description, such as will enable others skilled in the art to which it appertains to make and use the same.

The invention relates to improvements in gripping jaws adapted for use with twist drill, or analogous tool holding chucks, and the objects are to provide jaws of such a form as to be able to accurately center the shanks of the tools, and to exert a powerful pressure upon them, when the shanks are flat, without injury of any kind to the shank, and also to provide adjustable jaws of such a form as to adapt them to a varying number of sizes of flat shanks.

Twist drills are ordinarily provided with cylindrical shanks, and other cutting tools such as taps and reamers with shanks that are partly cylindrical or taper, and partly flat. The shanks to which the present jaws are adapted however, are flattened throughout their length and jaws of ordinary form can not properly center them and obtain the required purchase upon them without danger of rounding off the corners of the shanks or otherwise injuring them.

The invention further comprises the peculiar conformation of the jaws whereby they are capable of securely gripping and obtaining a purchase upon variable sizes of flat shanks, and of accurately centering the shanks in the chuck, and in the construction of the various details, as hereinafter described, shown in the accompanying drawings, and specifically pointed out in the claims.

In the accompanying drawings, Figure 1 is a plan or bottom view of the chuck showing the gripping edges of the jaws and an opening in the cover through which the tool is inserted; Fig. 2 is a side elevation thereof; Fig. 3 is a plan view of the jaws and chuck showing the jaws adjusted to engage with a wide shank and Fig. 4 is a similar view showing the jaws adjusted to engage with a smaller tool.

In these views 1 is the body of the chuck, 2, 2 are diametrical grooves in the face of the chuck in which the jaws 3, 3, having exactly parallel sides are movable toward and away from the axial line of the chuck. The right and left hand threaded screws 5 and 6 connected by means of a central unthreaded portion 7 are employed to operate the jaws, and the female screw is located partly in the jaws and partly in the clutch body as shown at 8 and 9 respectively, Fig. 2.

The twofold objects of adapting the inner and gripping faces of the jaws to securely engage with flat shanks of varying thickness and width and also to present to the side of the shank a driving shoulder and surface broad enough to provide for a direct application of pressure thereto, and so to prevent cutting away or twisting off the corner of the shank under the strong torsional strain upon the drill, are accomplished as follows; the gripping faces of the jaws are diagonally inclined at an angle approximating, preferably, 63%, and the edges of each gripping face are stepped at 12, forming an angle with the inclined face of approximately 72%. The shoulder 12 is not formed centrally of the jaw but at a slight distance on one side of the center so that the space inclosed between the two shoulders when the jaws are closed will closely approximate the thickness of the smallest shank to be used, as shown in Fig. 4. The inclined surfaces are therefore separated into two parts 10 and 11 upon different planes, parallel to the axis of the chuck. The shank will therefore lie diagonally in the jaws, and when the jaws are separated as in Fig. 3 it will be seen that a wide shank of much greater thickness can readily be inserted between and securely gripped by the jaws, and that the large shank will lie in them at substantially the same angle as the smaller shank. The shoulders or offsets 12 also provide broad bearing surfaces upon the driven sides of the shank, and when the pressure is brought to bear upon the drill the inclines 10 10, serve as wedges to force the shanks more tightly against the shoulders 12.

The device is applicable to use with all rotatable tools having flat shanks, whether plain or centrally ribbed, since the engagement is made by the shoulders only at the edges of the shanks.

The advantages of this form of jaws, are obvious in their power to accurately center the shank in the chuck, and also to obtain a definite and positive purchase thereon.

Having described the invention what I claim as new and desire to secure by Letters Patent is:—

1. In a chuck adapted to hold flat shanks of various sizes, oppositely moving jaws and engaging faces therein, said faces adapted for gripping and centering said shanks and comprising opposite parallel faces inclined to the center line of the jaws adapted to engage the edges of a shank, said faces provided with shoulders, spaced from each other on each side of the center line of said jaws, against which shoulders the sides of said shank are adapted to rest, said shoulders extending at an angle to the adjacent jaw faces.

2. In chuck jaws, adapted for centering and rotating a flat shank, faces therefor parallel to each other in each jaw and inclined to the center line of said jaws, said shoulders located on opposite sides of the center line of said jaws and spaced therefrom, said shoulders connecting said parallel faces in each jaw, and forming acute angles therewith, and the shoulder in one jaw parallel with the shoulder in the other jaw.

3. In a chuck for centering and driving a flat shank, in combination, oppositely moving jaws, each jaw provided with flat, long and short faces, said faces inclined relatively to the center line of the jaws and parallel to each other, the short face in one jaw being opposite to the long face in the other jaw, and oppositely facing parallel shoulders located on opposite sides of said center line a shoulder arranged to connect the inner edges of the said long and short planes in each jaw, each shoulder outwardly inclined relatively to the said center line of said jaws and spaced from said center line, thus providing a central opening having inclined sides.

4. In a chuck for centering and driving a flat shank, in combination, diametrically and oppositely movable jaws, parallel centering faces for said jaws, inclined to the center line of said jaws, said faces separated into long and short portions, the short portion of one face being opposed to the long portion of the other face, and an inclined driving shoulder connecting the inner edges of the long and short planes in each face, the said shoulders being located on opposite sides of the center line of said jaws, and parallel to each other, and spaced from each other, thus providing a central opening when the jaws are closed, adapted to permit of the introduction of varying sized shanks when the jaws are opened.

5. In chuck jaws adapted for centering and rotating varying sizes of flat shanks, in combination with said jaws, opposite inclined faces therefor, adapted to engage the edges of said shanks and opposite parallel inclined shoulders spaced laterally from the center line of said jaws, and located on opposite sides of the center line thereof, and adapted to engage the faces of said shanks, said inclined faces and shoulders forming the sides of a parallelogram inclined relatively to the center line of said jaws.

In testimony whereof I hereunto set my hand this 6" day of March 1908.

OTTO PARPART.

In presence of—
E. B. NORTHWAY,
WM. M. MONROE.